(12) United States Patent
Ishii et al.

(10) Patent No.: US 7,319,820 B2
(45) Date of Patent: Jan. 15, 2008

(54) METHOD OF MANUFACTURING OPTICAL COMMUNICATION SYSTEM

(75) Inventors: Yorishige Ishii, Yamatotakada (JP); Toshihiro Tamura, Shiki-gun (JP); Tetsuo Iwaki, Yamatokoriyama (JP); Yukio Kurata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 578 days.

(21) Appl. No.: 10/501,186

(22) PCT Filed: Apr. 2, 2003

(86) PCT No.: PCT/JP03/04217

§ 371 (c)(1),
(2), (4) Date: Jul. 8, 2004

(87) PCT Pub. No.: WO03/085864

PCT Pub. Date: Oct. 16, 2003

(65) Prior Publication Data

US 2005/0031353 A1   Feb. 10, 2005

(30) Foreign Application Priority Data

Apr. 4, 2002   (JP)   ............... 2002-103080

(51) Int. Cl.
*H04B 10/12* (2006.01)
*H04B 10/00* (2006.01)

(52) U.S. Cl. ............... 398/141; 398/153; 385/39; 385/42

(58) Field of Classification Search ............... 398/141, 398/142, 156; 385/39, 42
See application file for complete search history.

(56) References Cited

U.S. PATENT DOCUMENTS 4,045,120 A * 8/1977 de Corlieu et al. ........... 385/31

(Continued)

FOREIGN PATENT DOCUMENTS

JP   11-237535   8/1999
JP   2001-188149   7/2001

(Continued)

OTHER PUBLICATIONS

"OP i. LINK: Optical Transmission Techynology to Connect 10m by IEEE1394", *Nikkei Electronics*, Dec. 4, 2000, edition No. 784, pp. 167-176.

*Primary Examiner*—Jason Chan
*Assistant Examiner*—Nathan Curs
(74) *Attorney, Agent, or Firm*—George W. Neuner; David G. Conlin; Edwards Angell Palmer & Dodge LLP

(57) ABSTRACT

A position of a first module (12a) with respect to an optical fiber (11) is determined in accordance with a receiving efficiency at the first module (12a) with respect to light emitted from the optical fiber (11). Power of light coupled into the optical fiber (11) from the first module (12a) is set in accordance with a value of a far-end reflectivity on a side of the first module (12a) in the position so as to satisfy a predetermined formula. By giving priority to determining a condition that significantly influences an improvement of an eye opening ratio, it is possible to manufacture an optical communication system at a low cost and with more freedom in manufacturing. Thus provided is a method of manufacturing an optical communication system, the method allowing for manufacturing an optical communication system at a low cost and with more freedom in manufacturing.

5 Claims, 10 Drawing Sheets

U.S. PATENT DOCUMENTS

| | | | | |
|---|---|---|---|---|
| 4,329,017 A | * | 5/1982 | Kapany et al. | 385/22 |
| 4,381,882 A | * | 5/1983 | Sabine | 385/77 |
| 2002/0154369 A1 | * | 10/2002 | Fujita et al. | 359/173 |

FOREIGN PATENT DOCUMENTS

| | | |
|---|---|---|
| JP | 2003-060585 | 2/2003 |
| WO | WO 01/84751 A1 | 11/2001 |

* cited by examiner

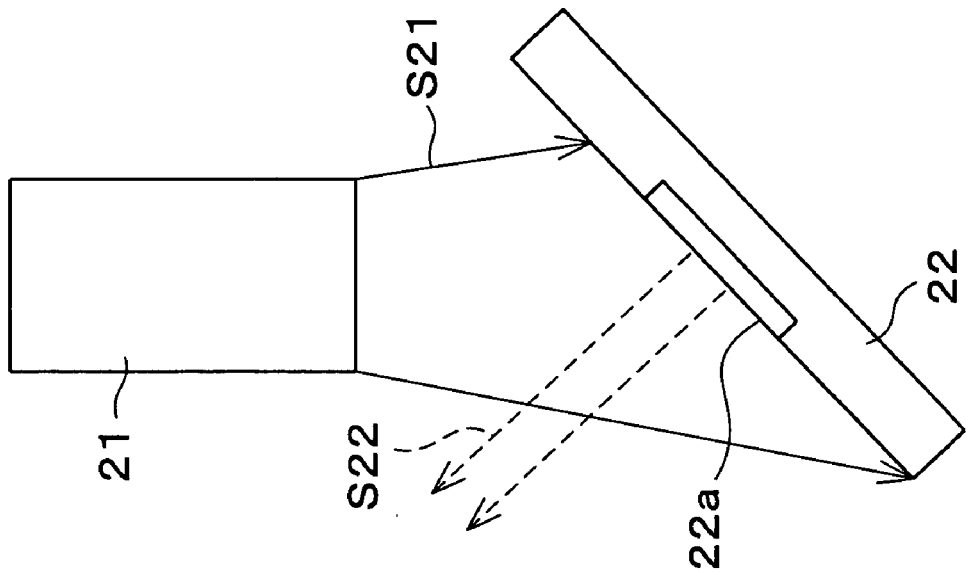
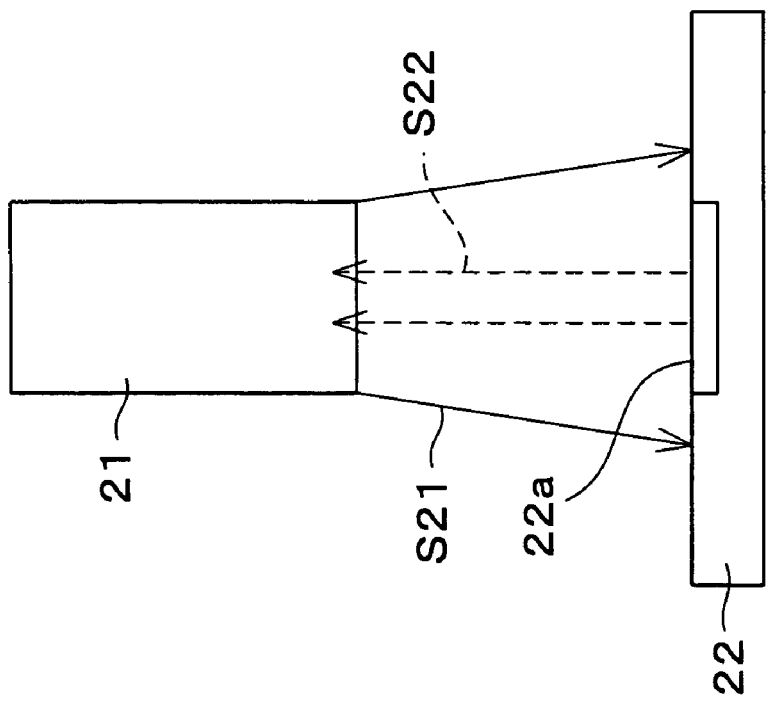
FIG. 8 (a)
FIG. 8 (b)

Prior Art

*Prior Art*

METHOD OF MANUFACTURING OPTICAL COMMUNICATION SYSTEM

This application is a US national stage application of PCT/JP03/04217 filed Apr. 2, 2003.

TECHNICAL FIELD

The present invention relates to a method of manufacturing an optical communication system including (i) an optical fiber and (ii) modules respectively provided at both ends of the optical fiber, the modules being capable of sending and receiving optical signals simultaneously via the optical fiber.

BACKGROUND ART

Conventionally, a domestic application of single-conductor full-duplex two-way communication is proposed. FIG. 10 is a conceptual diagram illustrating a domestic application example of the single-conductor full-duplex two-way communication. In this application example, electronic appliances such as a TV and a PC are connected with each other by an optical fiber 10 usable for the single-conductor full-duplex two-way communication, thus establishing a domestic multimedia network. The domestic multimedia network is connected with an outer network via a gateway and the like.

Digital broadcasting started in the fiscal year 2000. In a few years, it will become commonplace that a household is connected via FTTH (Fiber To The Home). In order to conform to the FTTH, the optical fiber of the household needs to have a transmission capacity of 100 Mbps at maximum. Approximately the same capacity is required for conforming to the digital broadcasting. Moreover, communication through network-type game machines and digital video editing machines will also be performed via the optical fiber of the household.

In order to realize such communication principally for high-definition video transmission, domestic communication requires a low-error-rate, high-quality transmission method with a transmission capacity of several-hundred Mbps.

As one such communication method, a domestic network by IEEE1394 is drawing attention. IEEE1394 supports a long-distance transmission and a very low error rate (lower than $10^{-12}$ in BER (Bit Error Rate)). Therefore, IEEE1394 is considered as an excellent method for the domestic multimedia network. As a medium of the long-distance transmission, a silica fiber and a POF (Plastic Optical Fiber) are considered. Especially, the POF is easy to use because the POF is easy to connect due to a large diameter thereof.

Incidentally, in order to realize the single-conductor full-duplex two-way communication, various proposals are made as to structures of members used for the single-conductor full-duplex two-way communication. For example, Japanese Publication for Unexamined Patent Publication, Tokukaihei 11-237535 (publication date: Aug. 31, 1999) (publication 1) discloses a structure of an optical sending and receiving device capable of preventing optical crosstalk that can occur while optical signals are being sent and received.

FIG. 11 is a perspective view illustrating a schematic arrangement of an optical sending and receiving device 100 disclosed in publication 1. The optical sending and receiving device 100 includes a laser light emitting source 101, an optical device 102, and a photodiode 103. The laser light emitting source 101 emits first signal light (laser light) s1.

The optical device 102 causes the first signal light s1 to be incident into an end surface 111a of an optical fiber 111 in such a direction that is different from a direction in which second signal light s2 is emitted from the end surface 111a of the optical fiber 111. The photodiode 103 receives the second signal light s2 emitted from the end surface 111a of the optical fiber 111. The optical sending and receiving device 100 has such a structure in which the photodiode 103 is positioned out of reach of reflected light s3. The reflected light s3 is generated when the first signal light s1 incident into the end surface 111a of the optical fiber 111 is reflected by the end surface 111a of the optical fiber 111. With the foregoing structure, it is possible to prevent optical crosstalk of near-end reflected light noises.

Moreover, attempts are made to identify requirements on a ratio (optical crosstalk ratio) between received light and the optical crosstalk, the requirements being for attaining the long-distance transmission and the low error rate, which are supported by IEEE1394. For example, a model for optical crosstalk setting in case full-duplex two-way communication is performed via a single-conductor POF is disclosed in "OP i. LINK: Optical Transmission Technology to Connect 10 m by IEEE1394", *Nikkei Electronics*, Dec. 4, 2000 edition (No. 784) (published on Dec. 4, 2000), pp. 167-176 (publication 2).

According to publication 2, in order to satisfy the requirement BER<$10^{-12}$, it is necessary that an amplitude of the received light be 19 times higher than dispersion of a Gaussian noise. After simulations and experimental data analyses were conducted, it was found that an amplitude of the optical crosstalk needs to be equal to or lower than one-fourth of the amplitude of the received light, that is, the optical crosstalk ratio needs to be equal to or larger than 6.0 dB.

Incidentally, noises (optical crosstalk noises) in the single-conductor full-duplex two-way communication includes not only the optical crosstalk considered in publication 1 (optical crosstalk caused by near-end reflection), but also optical crosstalk caused by far-end reflection. Therefore, it is also necessary to suppress the optical crosstalk noises caused by the far-end reflection. This is an inherent problem of the single-conductor full-duplex two-way communication. If full-duplex two-way communication is performed via a double-conductor fiber, it is not necessary to consider this problem.

In publication 1, there is description of optical crosstalk of the first signal light s1 caused on the end surface of the optical fiber 111. However, optical crosstalk caused by reflected returning light generated on an emission end of the optical fiber 111 and in a sender-side module are not considered.

Therefore, with the art of publication 1, it is not always possible to lower the bit error rate to a desired range.

On the other hand, publication 2 describes the optical crosstalk caused by the reflected returning light generated on the emission end of the optical fiber 111 and in the sender-side module. However, in publication 2, an acceptable amount of optical crosstalk is set uniformly, even though there are various parameters.

Therefore, in order to manufacture an optical communication system according to conditions disclosed in publication 2, it is necessary to satisfy strict requirements in designing an optical system and the like of each member. As a result, a cost of the optical communication system increases.

The present invention was made in light of the foregoing problems. An object of the present invention is therefore to provide a method of manufacturing an optical communication system, the method being capable of increasing degree of freedom in manufacturing the optical communication system, thereby attaining a lower cost.

DISCLOSURE OF INVENTION

In a method of the present invention for manufacturing an optical communication system including (i) an optical fiber and (ii) first and second modules respectively provided at both ends of the optical fiber, the first and second modules being capable of simultaneously sending and receiving optical signals via the optical fiber, a position of the first module with respect to the optical fiber is determined in accordance with a receiving efficiency at the first module with respect to light emitted from the optical fiber, and S1_ is set in accordance with a value of FR_ in the position so as to satisfy Formula 5:

(a) If $IO \geq 0.3$ (5)

$$\frac{(1-IO)}{0.7} > \frac{S\max*\left(\frac{NR}{R\min} + FR\_*PT\max^2\right) + X*\frac{Namp}{R\min}}{S1\_*PT\min}$$

(b) If $IO < 0.3$ $$1 > \frac{S\max*\left(\frac{NR}{R\min} + FR\_*PT\max^2\right) + X*\frac{Namp}{R\min}}{S1\_*PT\min}$$

where FR_ is a far-end reflectivity, which is a reflectivity (a) of light emitted from the second module and (b) on the first module and on the first-module-side end of the optical fiber; S1_ is power of light coupled into the optical fiber from the first module; Smax is a maximum value acceptable in the optical communication system as a value of the power of light coupled into the optical fiber; PTmin is a minimum value acceptable in the optical communication system as a transmittance of the optical fiber with respect to the optical signals; PTmax is a maximum value acceptable in the optical communication system as the value of the transmittance of the optical fiber with respect to the optical signals; NR is a ratio, with respect to Smax, of a stray light component received by the second module, the stray light component being generated on the second-module-side end of the optical fiber and in the second module when light to be coupled into the optical fiber with power of Smax is emitted from the second module; Rmin is a minimum receiving efficiency at the second module with respect to light emitted from the optical fiber; Namp is a light amount corresponding to a noise in an amplifier for converting, into an electric signal, an optical signal received by the second module; IO is an eye opening ratio required for the electric signal obtained by conversion through the amplifier; and X is a ratio, with respect to Namp, of an optical signal received by the second module when a bit error rate is in an upper limit value acceptable in the optical communication system, where it is assumed that there is no reflected light returning to the second module after being emitted from the second module.

With this method, it is possible to determine the position of the first module with priority on the receiving efficiency at the first module with respect to the light emitted from the optical fiber. Therefore, it is possible to avoid deterioration of the receiving efficiency at the first module. Incidentally, there is a trade-off between the receiving efficiency on a side of the first module and the far-end reflectivity FR_. The far-end reflectivity FR_ tends to increase if the receiving efficiency is improved. If the far-end reflectivity FR_ increases, the eye opening ratio at the second module is adversely affected.

In view of the circumstances, in the foregoing method, the power S1_ of the light coupled into the optical fiber from the first module is set in accordance with the far-end reflectivity FR_ so as to satisfy Formula 5. With this arrangement, it is possible to attain the eye opening ratio required for the electric signal obtained by conversion through the amplifier of the second module.

It is for the following reason that priority is given to the receiving efficiency on the side of the first module. The applicant of the present application found that, on an improvement of the eye opening ratio on a receiver side, the receiving efficiency on the receiver side has greater influence than the far-end reflectivity on a sender side. Therefore, if priority is given to the receiving efficiency on the side of the first module, and the first module is positioned so as to increase the receiving efficiency on the side of the first module, a requirement for improving the eye opening ratio on the side of the first module becomes less strict. That is, with all things considered, an optical communication system can be manufactured under a less strict requirement if priority is given to the receiving efficiency on the sender side (here, the side of the first module) in determining the position of the first module.

By thus giving priority to determining a condition that significantly influences the improvement of the eye opening ratio, it is possible to manufacture an optical communication system at a lower cost and with more freedom in manufacturing.

In a method of the present invention for manufacturing an optical communication system including (i) an optical fiber and (ii) first and second modules respectively provided at both ends of the optical fiber, the first and second modules being capable of simultaneously sending and receiving optical signals via the optical fiber, a position of the first module with respect to the optical fiber is determined in accordance with a receiving efficiency at the first module with respect to light emitted from the optical fiber, and, from plural groups of modules, the modules being different from group to group, a group in which S1min_ satisfies Formula 6

(a) If $IO \geq 0.3$ (6)

$$\frac{(1-IO)}{0.7} > \frac{S\max*\left(\frac{NR}{R\min} + FR\_*PT\max^2\right) + X*\frac{Namp}{R\min}}{S1\min\_*PT\min}$$

(b) If $IO < 0.3$ $$1 > \frac{S\max*\left(\frac{NR}{R\min} + FR\_*PT\max^2\right) + X*\frac{Namp}{R\min}}{S1\min\_*PT\min}$$

is selected in accordance with a value of FR_ in the position, and modules included in the selected group are used as the first module, where FR_ is a far-end reflectivity, which is a reflectivity (a) of light emitted from the second module and (b) on the first module and on the first-module-side end of the optical fiber; S1min_ is a minimum value among various values of power of light coupled into the optical fiber from a group of modules of a same kind adoptable as the first module; Smax is a maximum value acceptable in the optical communication system as a value of the power of light coupled into the optical fiber; PTmin is a minimum value acceptable in the optical communication system as a transmittance of the optical fiber with respect to the optical signals; PTmax is a maximum value acceptable in the optical communication system as the value of the transmittance of the optical fiber with respect to the optical signals; NR is a ratio, with respect to Smax, of a stray light component received by the second module, the stray light component being generated on the second-module-side end of the optical fiber and in the second module when light to be coupled into the optical fiber with power of Smax is emitted from the second module; Rmin is a minimum receiving efficiency at the second module with respect to light emitted from the optical fiber; Namp is a light amount corresponding to a noise in an amplifier for converting, into an electric signal, an optical signal received by the second module; IO is an eye opening ratio required for the electric signal obtained by conversion through the amplifier; and X is a ratio, with respect to Namp, of an optical signal received by the second module when a bit error rate is in an upper limit value acceptable in the optical communication system, where it is assumed that there is no reflected light returning to the second module after being emitted from the second module.

With this method, instead of individually setting properties of modules used as the first module, it is possible to consider various properties of the modules of the same kind in determining which kind of modules to adopt as the first module. As a result, it is possible to save time and labor to set the properties of the modules individually.

In a method of the present invention for manufacturing an optical communication system including (i) an optical fiber and (ii) first and second modules respectively provided at both ends of the optical fiber, the first and second modules being capable of simultaneously sending and receiving optical signals via the optical fiber, a position of the first module with respect to the optical fiber is determined in accordance with a receiving efficiency at the first module with respect to light emitted from the optical fiber, and PT1_ is set in accordance with a value of FR_ in the position so as to satisfy Formula 7:

(a) If $IO \geq 0.3$ (7)

$$\frac{(1-IO)}{0.7} > \frac{X * \frac{Namp}{R\min}}{S\min * PT1\_}$$

(b) If $IO < 0.3$ $$1 > \frac{S\max * \left(\frac{NR}{R\min} + FR\_ * PT\max^2\right) + X * \frac{Namp}{R\min}}{S\min * PT1\_}$$

where FR_ is a far-end reflectivity, which is a reflectivity (a) of light emitted from the second module and (b) on the first module and on the first-module-side end of the optical fiber; PT1_ is a transmitivity of the optical fiber with respect to light emitted from the first module; Smin is a minimum value acceptable in the optical communication system as a value of power of light coupled into the optical fiber; Smax is a maximum value acceptable in the optical communication system as a value of the power of light coupled into the optical fiber; PTmax is a maximum value acceptable in the optical communication system as a value of a transmittance of the optical fiber with respect to the optical signals; NR is a ratio, with respect to Smax, of a stray light component received by the second module, the stray light component being generated on the second-module-side end of the optical fiber and in the second module when light to be coupled into the optical fiber with power of Smax is emitted from the second module; Rmin is a minimum receiving efficiency at the second module with respect to light emitted from the optical fiber; Namp is a light amount corresponding to a noise in an amplifier for converting, into an electric signal, an optical signal received by the second module; IO is an eye opening ratio required for the electric signal obtained by conversion through the amplifier; and X is a ratio, with respect to Namp, of an optical signal received by the second module when a bit error rate is in an upper limit value acceptable in the optical communication system, where it is assumed that there is no reflected light returning to the second module after being emitted from the second module.

With this method, it is possible to attain the eye opening ratio required for the electric signal obtained by conversion through the amplifier of the second module, by adjusting the transmittance PT1_ of the optical fiber with respect to the light emitted from the first module, instead of adjusting the power S1_ of the light coupled into the optical fiber from the first module.

In a method of the present invention for manufacturing an optical communication system including (i) an optical fiber and (ii) first and second modules respectively provided at both ends of the optical fiber, the first and second modules being capable of simultaneously sending and receiving optical signals via the optical fiber, a position of the first module with respect to the optical fiber is determined in accordance with a receiving efficiency at the first module with respect to light emitted from the optical fiber, and from plural groups of modules, the modules being different from group to group, a group in which PT1min_ satisfies formula 8

(a) If $IO \geq 0.3$ (8)

$$\frac{(1-IO)}{0.7} > \frac{X * \frac{Namp}{R\min}}{S\min * PT1\min\_}$$

(b) If $IO < 0.3$ $$1 > \frac{S\max * \left(\frac{NR}{R\min} + FR\_ * PT\max^2\right) + X * \frac{Namp}{R\min}}{S\min * PT1\min\_}$$

is selected in accordance with a value of FR_ in the position, and modules included in the selected group are used as the first module, where FR_ is a far-end reflectivity, which is a reflectivity (a) of light emitted from the second module and (b) on the first module and on the first-module-side end of the optical fiber; PT1min_ is a minimum value among various values of a transmittance of the optical fiber with respect to light emitted from a group of modules of a same kind adoptable as the first module; Smin is a minimum value acceptable in the optical communication system as a value of power of light coupled into the optical fiber; Smax is a maximum value acceptable in the optical communication system as a value of the power of light coupled into the optical fiber; PTmax is a maximum value acceptable in the optical communication system as a value of a transmittance of the optical fiber with respect to the optical signals; NR is a ratio, with respect to Smax, of a stray light component received by the second module, the stray light component being generated on the second-module-side end of the optical fiber and in the second module when light to be coupled into the optical fiber with power of Smax is emitted from the second module; Rmin is a minimum receiving efficiency at the second module with respect to light emitted from the optical fiber; Namp is a light amount corresponding to a noise in an amplifier for converting, into an electric signal, an optical signal received by the second module; IO is an eye opening ratio required for the electric signal obtained by conversion through the amplifier; and X is a ratio, with respect to Namp, of an optical signal received by the second module when a bit error rate is in an upper limit value acceptable in the optical communication system, where it is assumed that there is no reflected light returning to the second module after being emitted from the second module.

With this method, instead of individually setting properties of modules used as the first module, it is possible to consider various properties of the modules of the same kind in determining which kind of modules to adopt as the first module. As a result, it is possible to save time and labor to set the properties of the modules individually.

In the foregoing methods for manufacturing an optical communication system, it is more suitable that the optical fiber is a plastic optical fiber, which is generally larger in diameter.

For a fuller understanding of the nature and advantages of the invention, reference should be made to the ensuing detailed description taken in conjunction with the accompanying drawings.

BRIEF DESCRIPTION OF DRAWINGS

FIGS. 8(a) and 8(b) are diagrams explaining with illustration that there is a trade-off between (i) the receiving efficiency at the receiver with respect to light emitted from the optical fiber and (ii) the far-end reflectivity.

BEST MODE FOR CARRYING OUT THE INVENTION

With reference to FIGS. 1 to 9(b), the following describes one embodiment of the present invention.

Figure 1:
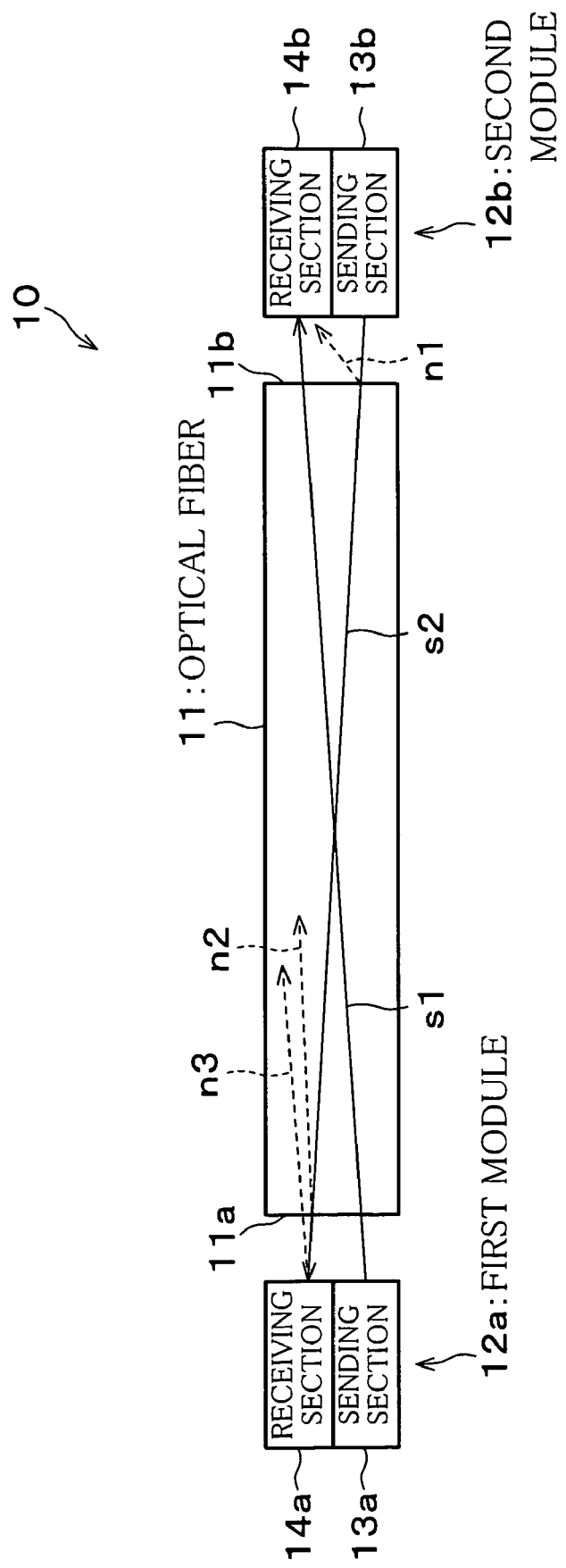
FIG. 1 is a conceptual diagram illustrating a relationship between signal light and reflected returning light (noise light) in single-conductor full-duplex two-way communication.

FIG. 1 is a conceptual diagram illustrating a relationship between signal light and reflected returning light in the single-conductor full-duplex two-way communication.

A single-conductor full-duplex two-way optical communication system 10 (optical communication system) of the present embodiment can be used for performing (i) domestic communication, (ii) communication between electronic appliances, (iii) LAN (Local Area Network), and the like, via a multimode optical fiber (e.g. a POF) as a transmission medium.

With reference to FIG. 1, optical crosstalk caused by reflected returning light generated on an end surface of an optical fiber and in a sender-side module is described in detail.

In order to perform single-conductor full-duplex two-way communication, the single-conductor full-duplex two-way optical communication system 10 includes an optical fiber 11 (e.g. a POF), and first and second modules 12a and 12b (optical communication modules) that are respectively provided at both end surfaces 11a and 11b of the optical fiber 11. The first and second modules 12a and 12b are capable of sending and receiving optical signals simultaneously via the optical fiber 11. The first module 12a includes a sending section 13a and a receiving section 14a. The sending section 13a sends (emits) signal light s1 to the second module 12b, and the receiving section 14a receives signal light s2 emitted from the second module 12b. Likewise, the second module 12b includes a sending section 13b and a receiving section 14b; the sending section 13b sends the signal light s2 to the first module 12a, and the receiving section 14b receives the signal light s1 emitted from the first module 12a.

Thus, in the single-conductor full-duplex two-way optical communication system 10, both the first module 12a and the second module 12b are capable of sending and receiving signal light. However, for the purpose of explanation, the following discussion focuses on how the signal light s1 sent from the first module 12a and received by the second module 12b is influenced by optical crosstalk.

The signal light s1 is emitted from the sending section 13a of the first module 12a, transmitted through the optical fiber 11, and received by the receiving section 14b of the second module 12b. At the same time, in order to perform full-duplex communication, the second module 12b emits the signal light s2 to the first module 12a while receiving the signal light s1. The signal light s2 causes the optical crosstalk, which is a noise to the signal light s1 to be received by the second module 12b. The optical crosstalk is caused as reflected returning light generated at each interface between the first module 12a and the second module 12b.

Specifically, optical crosstalk at the receiving section 14b of the second module 12b includes three kinds of reflected returning light n1, n2, and n3. The reflected returning light n1 is generated from the signal light s2 on the end surface 11b, which is an incident side, of the optical fiber 11. The reflected returning light n2 is generated from the signal light s2 on the end surface 11a, which is an emission side, of the optical fiber 11. The reflected returning light n3 is generated from the signal light s2 in the first module 12a. The reflected returning light n1 is called "near-end reflection", and the reflected returning light n2 and n3 are called "far-end reflection". Optical crosstalk to the signal light s1 is a sum of the reflected returning light n1 to n3.

In order to satisfy the requirement BER<$10^{-12}$ in the single-conductor full-duplex two-way communication, it is necessary to suppress the sum of the reflected returning light n1 to n3 to be smaller than a predetermined ratio with respect to a signal component that derives from the signal light s1, the reflected returning light n1 to n3 being generated from the signal light s2, which is for the sender-side module.

In publication 2, which is described in BACKGROUND ART section, a maximum value of the crosstalk caused by the far-end reflection is set uniformly. However, in order to design the single-conductor full-duplex two-way optical communication system 10 so as to attain the uniformly set value of the far-end reflection, design margin of the first and the second modules 12a and 12b becomes small. As a result, degree of freedom in optical design is decreased. When the degree of freedom in optical design is decreased, constraints in designing commercial products are increased. This increases a cost of the single-conductor full-duplex two-way optical communication system 10. Moreover, if such a specification as to uniformly set the maximum value of the optical crosstalk caused by the far-end reflection is adopted, the foregoing problems will prevent other business enterprises from adjusting their products to the specification. As a result, promotion of the specification will be difficult.

In view of the circumstances, the following discusses requirements for attaining BER<$10^{-12}$ in the single-conductor full-duplex two-way optical communication system 10 without lowering the degree of freedom in optical design.

First, the reflected returning light n1 to n3 are neglected. If there is no optical crosstalk caused by the reflected returning light n1 to n3, it is necessary that a signal light amount S and an amplifier noise Namp satisfy Formula 9:

$$\frac{S}{Namp} > 14.1 \tag{9}$$

Here, the signal light amount S is an amount of signal light coupled into the photodiode (PD) provided to the receiving section 14b of the second module 12b, and the amplifier noise Namp is an rms value of a noise current generated by a first-stage preamplifier, the rms value being expressed in light amount.

In Formula 9, it is supposed that the single-conductor full-duplex two-way optical communication system 10 satisfies BER<$10^{-12}$. Here, if (i) an optical signal and an electric signal are considered to be equivalent (that is, if an amplitude of received light and an amplitude of an electric signal obtained by converting the received light through the photodiode are considered to be equivalent), and (ii) whether the optical signal represents "0" or "1" in a binary signal is judged from a half level of the amplitude of the electric signal corresponding to the optical signal, BER of the optical signal is generally given by the following Formula 10:

$$BER = 0.5 * \left(1 - \frac{2}{\sqrt{\pi}} \int_0^{\frac{SN}{2*\sqrt{2}}} e^{-t^2} dt\right) \tag{10}$$

Note that "*" in the present description is a multiplication sign.

A signal-noise ratio SN is a ratio S/Namp between the signal light amount S and the amplifier noise Namp. From Formula 10, BER<$10^{-12}$ is satisfied when the signal-noise ratio SN is 14.1 (11.5 dB). When the signal-noise ratio SN is 14.1, the ratio expressed in electric power is $14.1^2 \approx 200$ (approximately 23 dB).

The present invention may be applied to cases other than BER<$10^{-12}$. In a generalized expression, BER is given by Formula 11. When BER is $10^{-8}$, $10^{-10}$, $10^{-11}$, $10^{-12}$, or $10^{-13}$, X is 11.1, 12.0, 12.8, 13.5, 14.1, or 14.7, respectively.

$$\frac{S}{Namp} > X \tag{11}$$

Figure 2:
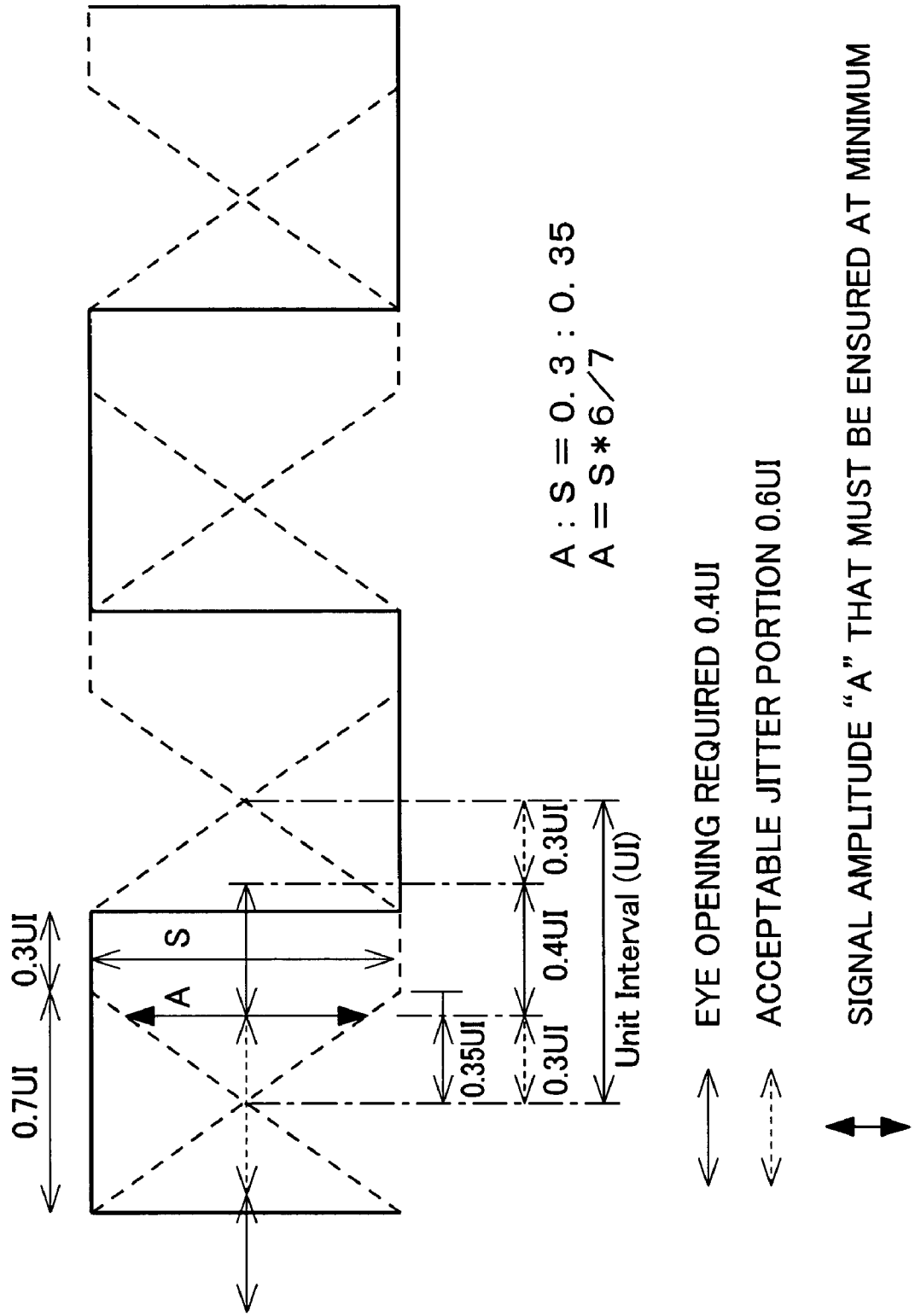
FIG. 2 is a diagram illustrating an eye pattern for explaining an eye opening ratio required.

In reality, the signal light amount S cannot be constant during a full unit interval (UI). If an NRZ encoding, which is often used as an encoding rule for optical fiber communication, is used, it is required that a −3 dB bandwidth of the system be at least twice a bit rate. For example, if a transmission rate of the system is 250 Mbps, a bandwidth required is 125 MHz. If the transmission rate of the system is 125 MHz, a rising and falling speed of an eye pattern of the system is 2.8 nsec at 0.35/125 MHz. Moreover, a minimum phase margin required is approximately 0.4 UI, the phase margin being transmitted from an optical transceiver to a physical layer LSI provided downstream. Because the UI of 250 Mbps is 4 nsec, a maximum signal amplitude cannot be attained throughout 0.4 UI. As shown in FIG. 2, in general, a steepest edge portion of an eye opening is influenced by a taper of rise and fall. Basically, a substantive amplitude A of an eye opening edge portion is expressed as (1-IO)/2/0.35*S, where IO is an eye opening ratio required. When the eye opening ratio required is 0.4 UI as in the foregoing example, the amplitude A of the eye opening edge portion is 6/7 of the signal light amount S.

Therefore, when the eye opening ratio IO required is not less than 0.3, Formula 11 is expressed as Formula 12:

$$\frac{S*(1-IO)/0.7}{Namp} > X \tag{12}$$

Next, the reflected returning light n1 to n3 are taken into consideration. If there is optical crosstalk caused by the reflected returning light n1 to n3, noises can be conceived as a loss of an amount of the optical signal, the loss being equal to amounts of the reflected returning light n1 to n3. Therefore, in the end, the following Formula 13 needs to be satisfied:

(a) If $IO \geq 0.3$ $$\frac{S*(1-IO)/0.7-(N1+N2+N3)}{Namp} > X \qquad (13)$$

(b) If $IO < 0.3$ $$\frac{S-(N1+N2+N3)}{Namp} > X$$

where N1, N2, and N3 are the amounts of the reflected returning light n1 to n3, respectively.

Usually, the signal-noise ratio becomes a worst ratio when the signal light amount S is the smallest, and the amplifier noise Namp generated by the preamplifier becomes dominant among electric noises. With respect to this noise current, considering rising and falling time of the system as described above, it is necessary to keep, to a certain value or more, a value obtained by subtracting the light amounts N1, N2, and N3 of the reflected returning light n1 to n3 from the signal light amount S.

The following explains meaning of signs used in this description.

Amplifier noise Namp: A light amount corresponding to an rms value of the noise current, the noise current being generated by the first-stage preamplifier of the receiving section 14b of the second module 12b.

Signal-noise ratio limit value X: A limit value of the signal-noise ratio SN that attains predetermined BER if there is no reflected returning light.

Signal light amount S: An amount of signal light emitted from the optical fiber 11 and coupled into the photodiode of the receiving section 14b of the second module 12b. The signal light amount S can be measured by receiving, at an optical power meter or the like, all light beams of emitted light.

Acceptable minimum fiber-coupled optical power Smin: A minimum value acceptable as power of light coupled into the optical fiber 11 in the single-conductor full-duplex two-way optical communication system 10.

Acceptable maximum fiber-coupled optical power Smax: A maximum value acceptable as the power of light coupled into the optical fiber 11 in the single-conductor full-duplex two-way optical communication system 10.

Sender-side fiber-coupled optical power S1: An amount of light coupled into the optical fiber 11, the light coupled into the optical fiber 11 being a part of the signal light s1 transmitted from the sending section 13a of the first module 12a (the sender side). The sender-side fiber-coupled optical power S1 can be measured by coupling the signal light s1 into one end of an optical fiber (which is so short, e.g. 1 m, that decay is ignorable), and measuring an amount of light emitted from the other end of the optical fiber.

Sender-side minimum fiber-coupled optical power S1min: A minimum value among various values of the sender-side fiber-coupled optical power S1, the various values deriving from various properties of identical light sources and identical optical systems used in a group of the first module 12a.

Acceptable minimum transmittance PTmin: A minimum transmittance acceptable in the single-conductor full-duplex two-way optical communication system 10.

Acceptable maximum transmittance PTmax: A maximum transmittance acceptable in the single-conductor full-duplex two-way optical communication system 10.

Sent light transmittance PT1: An efficiency indicated by an amount of light transmitted through the optical fiber 11, the light transmitted through the optical fiber 11 being a part of light sent from the sending section 13a of the first module 12a (the sender side) and coupled into the optical fiber 11. The sent light transmittance PT1 can be obtained by coupling light, with identical fiber-coupled optical power, into optical fibers having different lengths, and measuring amounts of light emitted from the respective optical fibers.

Sent light minimum transmittance PT1min: A minimum value among various values of the sent light transmittance PT1 with respect to light (the signal light s1) sent from a group of the first module 12a using identical light sources and identical optical systems, the various values deriving from various properties of the identical light sources and identical optical systems used in the group of the first module 12a.

Near-end reflectivity NR: A value indicating an amount of inner scattered light (a stray light component), such as leaked and scattered light, generated on the end surface 11b and in the second module 12b, and received by the receiving section 14b of the second module 12b, the inner scattered light being a part of the signal light s2 sent from the second module 12b. The near-end reflectivity NR is a ratio of the amount of the inner scattered light received, with respect to the acceptable maximum fiber-coupled optical power Smax.

Far-end reflectivity FR: A sum of a reflectivity PFR and a reflectivity MFR. The reflectivity PFR is a reflectivity of the signal light s2 sent from the second module 12b and reflected on the end surface 11a, i.e. the end surface on the side of the first module 12a. The reflectivity MFR is a reflectivity of the signal light s2 sent from the second module 12b and reflected by the first module 12a, which is the sender-side module.

Minimum receiving efficiency Rmin: A minimum value of a ratio of the light coupled into the photodiode of the receiving section 14b of the second module 12b, with respect to the light emitted from the optical fiber 11.

Full unit interval UI (Unit Interval): A unit interval of the system.

Eye opening ratio IO required: An eye opening ratio required where the full unit interval UI is 1.

Eye opening edge portion amplitude A: A signal amplitude at a phase margin edge portion of the eye pattern.

Note that, when something is "acceptable in the single-conductor full-duplex two-way optical communication system 10", it is accepted by a specification or the like of the single-conductor full-duplex two-way optical communication system 10.

First Embodiment

In order to connect devices that are in the same room or in adjacent rooms, 10 m is a sufficient wire length. Here, a 10 m-length SI-type (Step Index type) plastic optical fiber MH4001 (a product of Mitsubishi Rayon Co., Ltd) is used as the optical fiber 11 of the single-conductor full-duplex two-way optical communication system 10. Discussed below is a case in which the first module 12a has a 125 Mbps transmission capacity, which is relatively low, and the second module 12b has a 250 Mbps transmission capacity, which is relatively high. A phase margin required by the physical-layer LSI provided downstream is 0.4 UI, which is a common value.

Principal constituents are as follows. In the first module 12a (which has the 125 Mbps transmission capacity), (i) the photodiode of the receiving section 14a is a high-speed PIN-PD (a product of Sharp Kabushiki Kaisha) whose light receiving section has a ø440 μm diameter, (ii) the preamplifier is an fc125 MHz product (a product of Sharp Kabushiki Kaisha) whose amplification noise is 55 nA, (iii) a sender of the sending section 13a is a red LED (a product of Sharp Kabushiki Kaisha), and (iv) an LED driver is an fc125 MHz product (a product of Sharp Kabushiki Kaisha). In the second module 12b (which has the 250 Mbps transmission capacity), (i) the photodiode of the receiving section 14b is a high-speed PIN-PD (a product of Sharp Kabushiki Kaisha) whose light receiving section has a ø350 μm diameter, (ii) the preamplifier is an fc125 MHz product (a product of Sharp Kabushiki Kaisha) whose amplification noise is 98 nA, (iii) a sender of the sending section 13b is a red LED (RIN-120 dB, a product of Sharp Kabushiki Kaisha), and (iv) an LED driver is Max3766 (a product of Maxim).

Values of principal parameters that determine the signal-noise ratio SN are as follows. A minimum transmittance of the optical fiber 11 per unit length is −0.51 dB/m (in case the sender is an LED). A maximum transmittance of the optical fiber 11 per unit length is −0.15 dB/m (in case the sender is an LED). The acceptable maximum fiber-coupled optical power Smax acceptable in the single-conductor full-duplex two-way optical communication system 10 is −2.7 dB. The minimum fiber-coupled optical power Smin acceptable in the single-conductor full-duplex two-way optical communication system 10 is −10.9 dB. A worst value of a receiving coupling efficiency between (i) the optical fiber 11 and (ii) the receiving sections 14a and 14b is −8 dB. The near-end reflectivity of the reflected returning light n1 is 0.1% (with respect to the Smax), and the far-end reflectivity of the reflected returning light n1 and n2 is 1.4%. A minimum quenching ratio of the single-conductor full-duplex two-way optical communication system 10 is 10.

Figure 3:
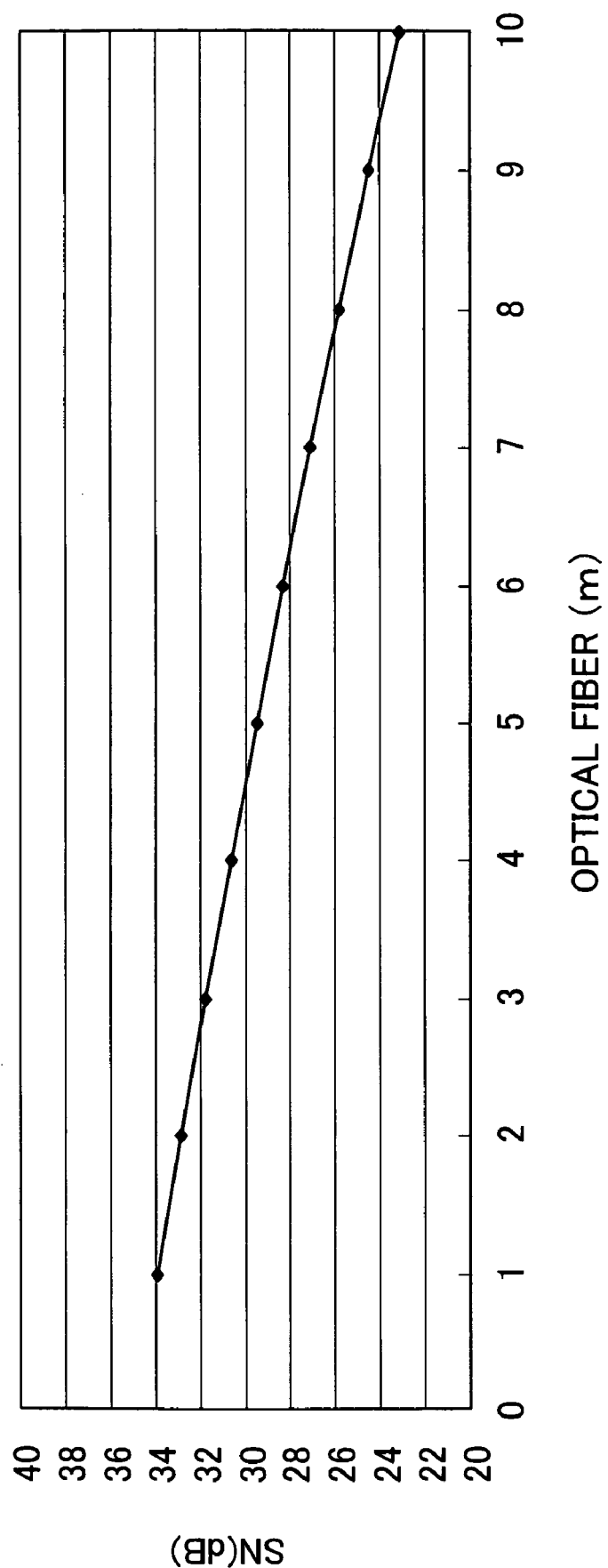
FIG. 3 is a graph illustrating a relationship between a signal-noise ratio SN and a fiber length of an optical fiber.

The signal-noise ratio SN becomes a worst ratio when an optical signal is sent from (i) the 125 Mbps first module 12a using the LED with which the minimum transmittance is −51 dB/m to (ii) the 250 Mbps second module 12b using the LED with which the maximum transmittance is −0.15 dB/m. FIG. 3 shows the signal-noise ratio with respect to each fiber length of the optical fiber 11 under the foregoing worst combination. The signal-noise ratio SN becomes the worst ratio when the fiber length of the optical fiber 11 is 10 m. Nonetheless the signal-noise ratio SN satisfies a desired value of not lower than 23 dB.

The signal-noise ratio SN can be improved by increasing optical power of the LD or the LED, that is, by relatively raising the fiber-coupled optical power. However, because the single-conductor full-duplex two-way optical communication system 10 here is for household use, it is necessary to consider safety for the eyes, power consumption, life of the light-emitting element, and the like. Therefore, an average value of the fiber-coupled optical power is at most approximately −2.7 dBm. Incidentally, the minimum value of the fiber-coupled optical power is approximately −10.9 dBm, considering that APC and the like cannot be performed in case of the LED, and that the fiber-coupled optical power varies.

A worst value of the receiving coupling efficiency is approximately −8 dB, considering that the diameter of the optical fiber 11 is larger than the diameter (1 mm) of the receiving section of the photodiode, and an NA of light emitted from the optical fiber 11 is large in case the sent light is LED light, and considering, for example, a loss incurred when the optical signals sent and received are divided by a wave division or a polarization division.

The far-end reflectivity FR can be decreased to some extent by an end-surface slanting process or a spherical process in case the optical fiber 11 is the SI-type plastic optical fiber, for example. In this case, the far-end reflectivity of the optical fiber 11 can be suppressed to approximately 0.7%. Moreover, through an experiment, it was confirmed that a far-end reflectivity on the sender-side can also be suppressed to approximately 0.7% by slanting the element, for example. Therefore, the far-end reflectivity FR of the reflected returning light n2 and n3 is set to 1.4%.

An appropriate value of the near-end reflectivity NR is 1/1000 of the acceptable maximum fiber-coupled optical power Smax, considering scattering and the like incurred on the incident end of the optical fiber 11.

In this case, the signal-noise ratio expressed in electric power is not lower than 23 dB, even after the optical signal is transmitted 10 m. Thus, it is possible to attain an excellent transmission quality that satisfies BER<$10^{-12}$.

Figure 4:
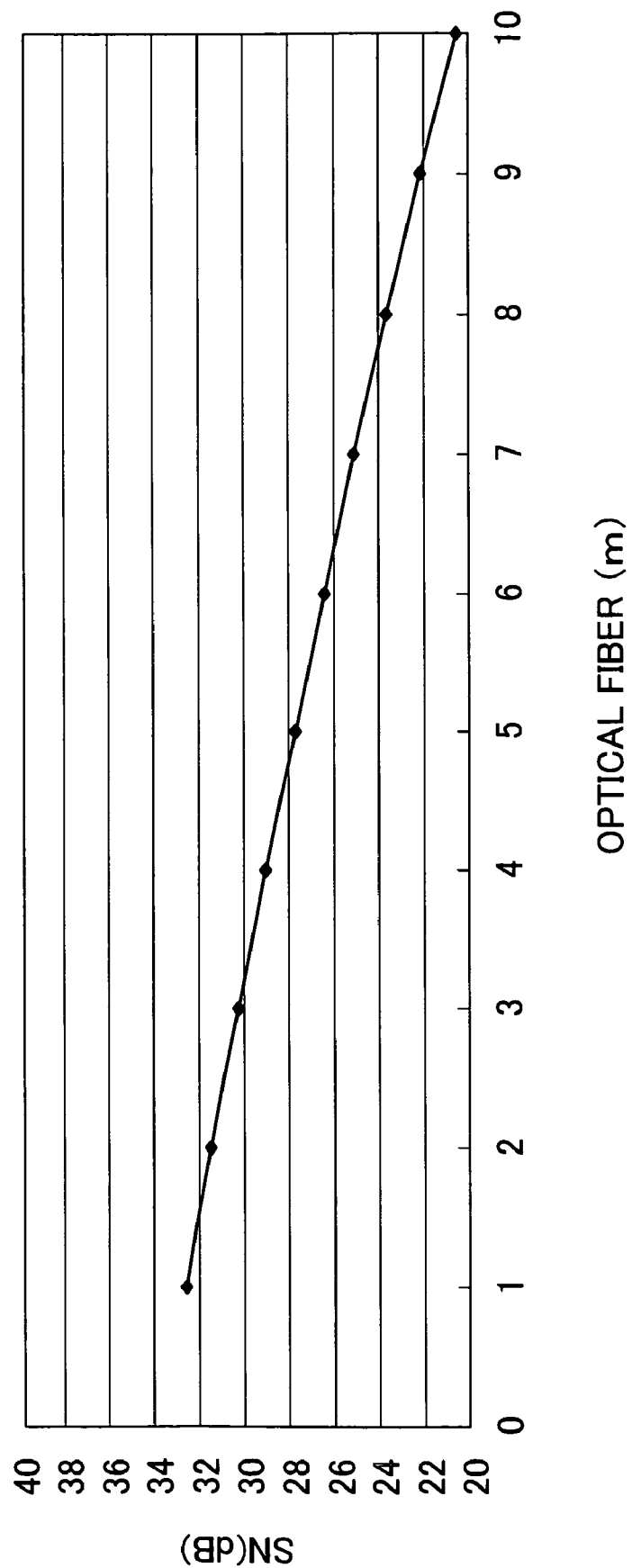
FIG. 4 is a graph illustrating a relationship between the signal-noise ratio SN and the fiber length of the optical fiber.

On the other hand, if the far-end reflectivity FR is 2.4%, the signal-noise ratio SN becomes 20.5 dB after the optical signal is transmitted 10 m, as shown in FIG. 4. As a result, the desired value of 23 dB cannot be satisfied.

Discussed below is a case in which a signal is transmitted from the first module 12a to the second module 12b in the single-conductor full-duplex two-way optical communication system 10.

Formula 13(a) can be transformed into Formula 14. Here, it is necessary to set the signal light amount S so that the signal-noise ratio becomes the worst ratio. Therefore, the signal light amount S, which is the amount of light coupled into the photodiode provided to the receiving section 14b of the second module 12b, is given by Formula 15.

$$(1-IO)/0.7 > \frac{(N1+N2+N3)}{S} + X * \frac{Namp}{S} \quad (14)$$

$$S = Smin * PTmin * Rmin \quad (15)$$

The acceptable minimum transmittance Ptmin is a minimum transmittance of the optical fiber 11 acceptable in the single-conductor full-duplex two-way optical communication system 10. The acceptable minimum transmittance Ptmin is the minimum transmittance per unit length multiplied by the length of the optical fiber 11.

The minimum receiving efficiency Rmin is the ratio of the light coupled into the photodiode, the light coupled into the photodiode being a part of the light emitted from the optical fiber 11. The minimum receiving efficiency Rmin is given by (the amount of the light coupled into the photodiode)/(the amount of the light emitted from the optical fiber).

From FIG. 1, the sum (N1+N2+N3) of the reflected returning light n1 to n3, which are causes of the optical crosstalk, is given by Formula 16 when an amount of the signal light emitted from the receiver side is the strongest.

$$N1+N2+N3 = Smax * ((MFR+PFR) * PTmax^2 * Rmin) + NR) \quad (16)$$

The acceptable maximum transmittance PTmax is a maximum transmittance of the optical fiber 11 acceptable in the single-conductor full-duplex two-way optical communication system 10. The acceptable maximum transmittance PTmax is the maximum transmittance per unit length multiplied by the length of the optical fiber 11.

By plugging Formula 16 into Formula 14 and then simplifying Formula 14, Formula 17(a) is obtained. Likewise, Formula 17(b) is obtained by transforming Formula 13(b). In order to cause the BER to be smaller than the predetermined value, Formula 17 needs to be satisfied.

(a) If $IO \geq 0.3$ (17)

$$\frac{(1-IO)}{0.7} > \frac{S\max*\left(\frac{NR}{R\min}+FR*PT\max^2\right)+X*\frac{Namp}{R\min}}{S\min*PT\min}$$

(b) If $IO < 0.3$ $$1 > \frac{S\max*\left(\frac{NR}{R\min}+FR*PT\max^2\right)+X*\frac{Namp}{R\min}}{S\min*PT\min}$$

In Formulas 17(a) and 17(b), (i) the denominators of the respective right sides and (ii) the far-end reflectivity FR are determined principally by the first module 12a, and the numerators except the far-end reflectivity FR are determined principally by the second module 12b.

In general, the acceptable maximum fiber-coupled optical power Smax and the acceptable minimum fiber-coupled optical power Smin are determined by the specification of the single-conductor full-duplex two-way optical communication system 10. The acceptable maximum transmittance PTmax and the acceptable minimum transmittance PTmin depend on a wavelength of a light source used, and on an excitation NA of the light source used. Usually, the wavelength and the excitation NA are also determined by the specification. Therefore, in the single-conductor full-duplex two-way optical communication system 10 that satisfies the specification, the fiber-coupled optical light power is within a range between the acceptable minimum fiber-coupled optical power Smin and the acceptable maximum fiber-coupled optical power Smax, and the transmittance of the optical fiber 11 is within a range between the acceptable minimum transmittance PTmin and the acceptable maximum transmittance PTmax.

In order to cause the signal-noise ratio to be equal to or higher than the predetermined value, it is necessary to satisfy the following condition: (1) a ratio NR/Rmin and a ratio Namp/Rmin are smaller than a certain value on the receiver side, that is, on the side of the second module 12b, the ratio NR/Rmin being a ratio between the near-end reflectivity NR and the minimum receiving efficiency Rmin, and the ratio Namp/Rmin being a ratio between the amplifier noise Namp and the minimum receiving efficiency Rmin, or (2) the far-end reflectivity FR is lower than a certain value on the sender side, that is, on the side of the first module 12a.

Here, the single-conductor full-duplex two-way optical communication system 10 as a whole is considered. If the far-end reflectivity on the sender side is already determined, it is necessary to set NR/Rmin so as to satisfy Formula 17 under the conditions that the fiber-coupled optical power is within the range between the acceptable minimum fiber-coupled optical power Smin and the acceptable maximum fiber-coupled optical power Smax, and that the transmittance of the optical fiber 11 is within the range between the acceptable minimum transmittance PTmin and the acceptable maximum transmittance PTmax. While NR/Rmin can be adjusted freely as long as the foregoing conditions are satisfied, the far-end reflectivity FR cannot be adjusted on the receiver side. Therefore, it is necessary to set the far-end reflectivity FR on the sender side to be lower than the certain value.

In the single-conductor full-duplex two-way optical communication system 10 of the present embodiment, (i) the near-end reflectivity NR is approximately 0.1% due to scattering and the like caused when the signal light s2 is incident into the optical fiber 11, (ii) in a worst case, a lower limit of the minimum receiving efficiency Rmin is approximately 20%, due to (a) a difference between a fiber diameter of the photodiode and that of the optical fiber 11, (b) an efficiency of dividing the optical signals sent and received, (c) a radial pattern of the light emitted from the optical fiber 11, and the like, and (iii) NR/Rmin is 0.005.

As described above, it is necessary to set the far-end reflectivity FR on the sender side to be lower than the certain value. In case of the single-conductor full-duplex two-way optical communication system 10 in which the optical fiber is short and the transmittance of the optical fiber 11 is high, it is necessary to set the far-end reflectivity FR on the sender side to be a very low value. As a result, freedom of module design is narrowed.

In view of the circumstances, the following conditions are set in the present embodiment. If the far-end reflectivity FR cannot be lower than the predetermined value in formula 17, the far-end reflectivity FR is considered as a variable. Because the far-end reflection is caused on the sender side (here, on the side of the first module 12a), it is possible to consider that the sent signal per se includes a noise.

By increasing the sender-side fiber-coupled optical power S1 by an amount of the noise, it is possible to cancel the noise increased by the far-end reflection. "Smin" in Formula 17 can be set freely as long as the fiber-coupled optical power S1 is within the range between Smin to Smax, the range being acceptable in the single-conductor full-duplex two-way optical communication system 10. Therefore, it is possible to consider "Smin" in Formula 17 as an adjustable variable (sender-side fiber-coupled optical power S1_).

As a result, FIG. 17 can be expressed as FIG. 18. In FIG. 18, "_" attached after a sign indicates that the sign is a variable.

(a) If $IO \geq 0.3$ (18)

$$\frac{(1-IO)}{0.7} > \frac{S\max*\left(\frac{NR}{R\min}+FR\_*PT\max^2\right)+X*\frac{Namp}{R\min}}{S1\_*PT\min}$$

(b) If $IO < 0.3$ $$1 > \frac{S\max*\left(\frac{NR}{R\min}+FR\_*PT\max^2\right)+X*\frac{Namp}{R\min}}{S1\_*PT\min}$$

Therefore, by adjusting the sender-side fiber-coupled optical power S1 in accordance with a value of the far-end reflectivity FR, a relatively large far-end reflection becomes acceptable. In the foregoing specific example, by simply setting the sender-side fiber-coupled optical power S1 to −10.5 dBm, a maximum acceptable value of the far-end reflectivity FR is increased to 2%.

Instead of the sender-side fiber-coupled optical power S1, the acceptable minimum transmittance PTmin may be improved by changing the excitation NA of, or managing a wavelength of, the light (signal light s1) sent from the sending section 13a of the first module 12a, which is the sender side. When "PTmin" in formula 17 is considered as an adjustable variable (sent light transmittance PT1_), Formula 17 can be expressed as Formula 19.

(a) If $IO \geq 0.3$              (19)

$$\frac{(1-IO)}{0.7} > \frac{S\max * \left(\frac{NR}{R\min} + FR\_ * PT\max^2\right) + X * \frac{Namp}{R\min}}{S\min * PT1\_}$$

(b) If $IO < 0.3$ $$1 > \frac{S\max * \left(\frac{NR}{R\min} + FR\_ * PT\max^2\right) + X * \frac{Namp}{R\min}}{S\min * PT1\_}$$

Figure 5:
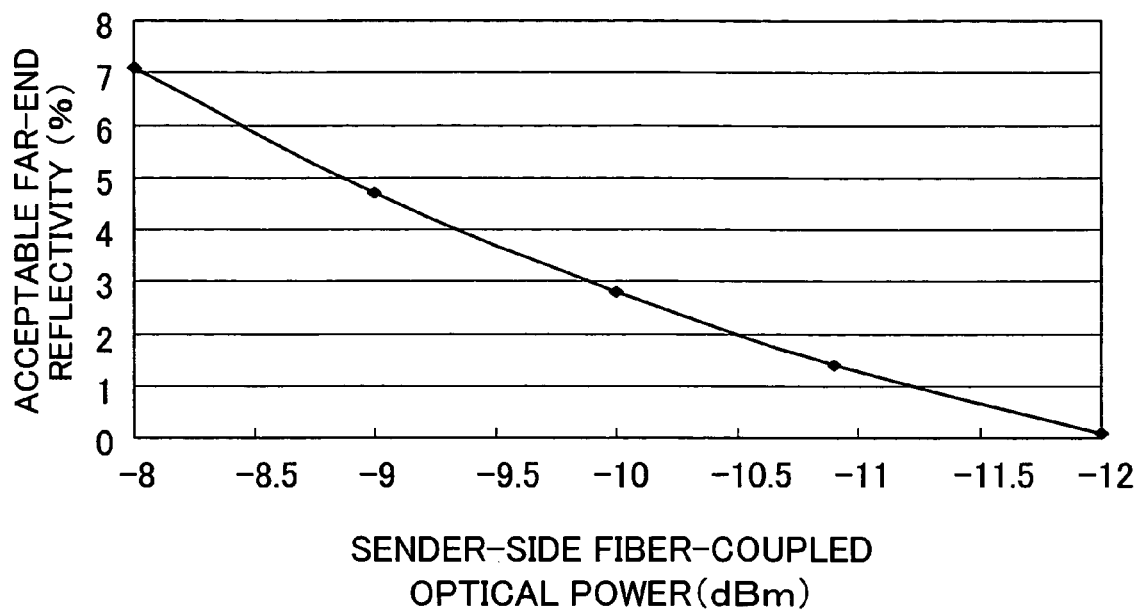
FIG. 5 is a graph illustrating a relationship between a sender-side fiber-coupled optical power and an acceptable far-end reflectivity.
Figure 6:
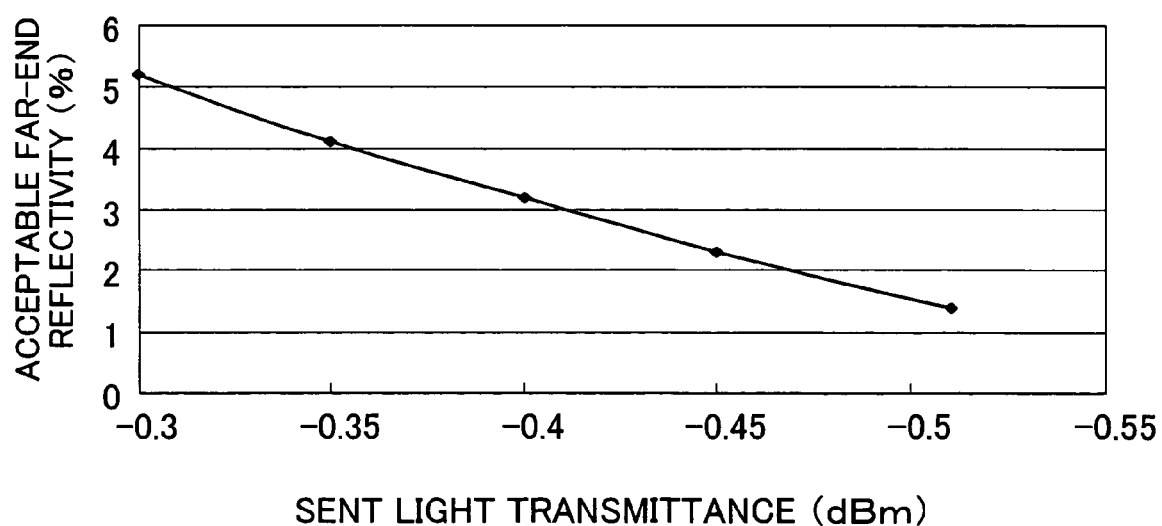
FIG. 6 is a graph illustrating a relationship between a sent light transmittance and the acceptable far-end reflectivity.

FIG. 5 is a graph showing the far-end reflectivity FR with respect to different values of the sender-side fiber-coupled optical power S1_. FIG. 6 is a graph showing the far-end reflectivity FR with respect to different values of the sent light transmittance PT1_. In FIGS. 5 and 6, the far-end reflectivity FR is determined so as to satisfy the condition that the signal-noise ratio is 14.1 (200 in a optical power and in electric power). It is found that the acceptable far-end reflectivity increases as the sender-side fiber-coupled optical power S1_ or the sent light transmittance PT1_ increases.

Therefore, in a method of the present embodiment for manufacturing the single-conductor full-duplex two-way optical communication system 10, the sender-side fiber-coupled optical power S1_, which is the power of light coupled into the optical fiber 11 from the first module 12a, is adjusted according to Formula 18, in accordance with the far-end reflectivity FR_ on the side of the first module 12a.

Alternatively, in a method of the present embodiment for manufacturing the single-conductor full-duplex two-way optical communication system 10, the sent light transmittance PT1_, which is the transmittance of the optical fiber 11 with respect to the first signal light s1 emitted from the first module 12a, is adjusted according to Formula 19, in accordance with the far-end reflectivity FR_ on the side of the first module 12a.

In these manufacturing methods, first, the far-end reflectivity, FR_ on the side of the first module 12a is found by using actual members of the single-conductor full-duplex two-way optical communication system 10. Then, the sender-side fiber-coupled optical power S1_ or the sent light transmittance PT1_ is adjusted in accordance with the far-end reflectivity FR_ found.

The following more specifically describes advantages of adjusting the sender-side fiber-coupled optical power S1_ or the sent light transmittance PT1_ in accordance with the far-end reflectivity FR_.

Figure 7:
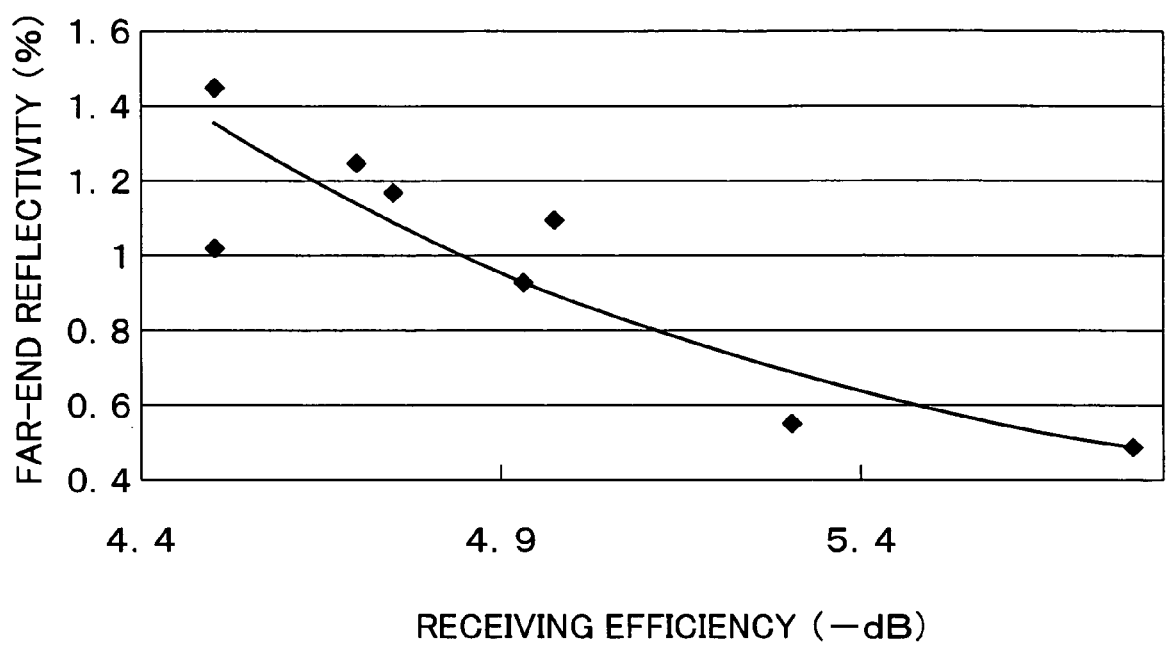
FIG. 7 is a graph illustrating a relationship between a receiving efficiency and a far-end reflectivity at a receiver.
Figure 9:
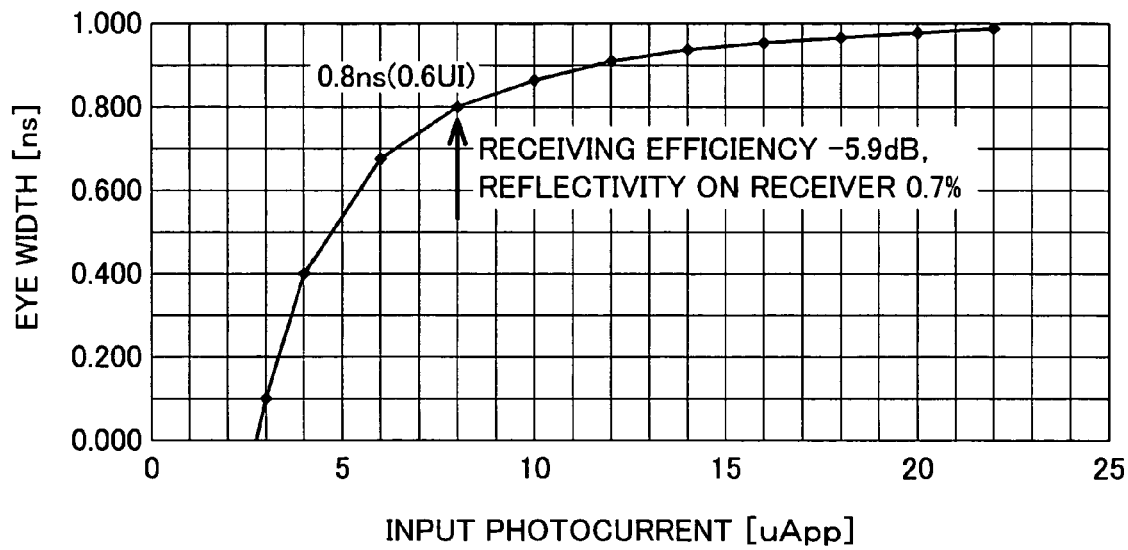
FIGS. 9(a) and 9(b) are graphs showing influences of the receiving efficiency and the far-end reflectivity on the eye opening ratio IO.
Figure 9:
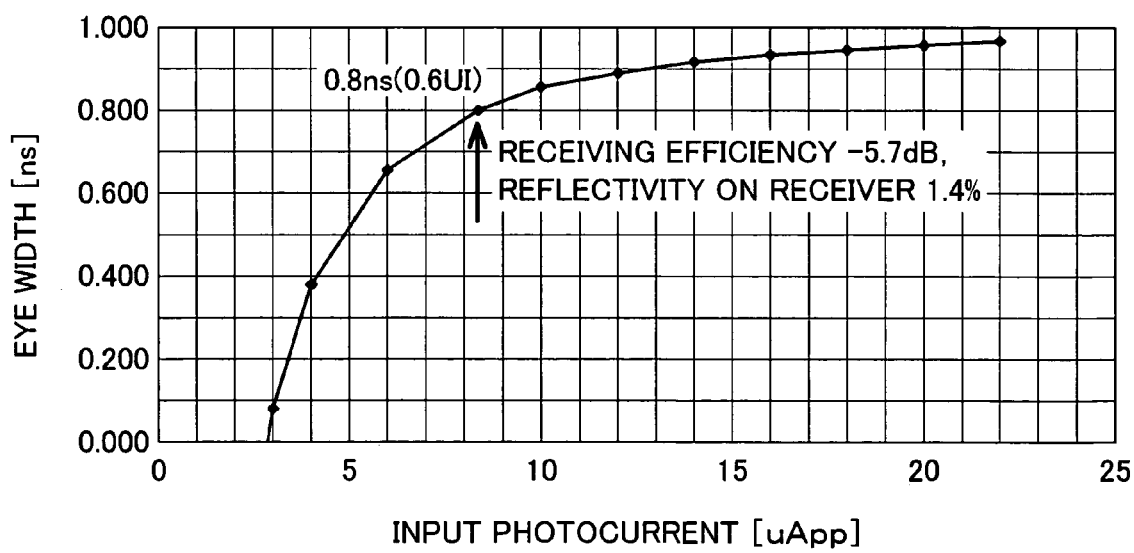
Figure 10:
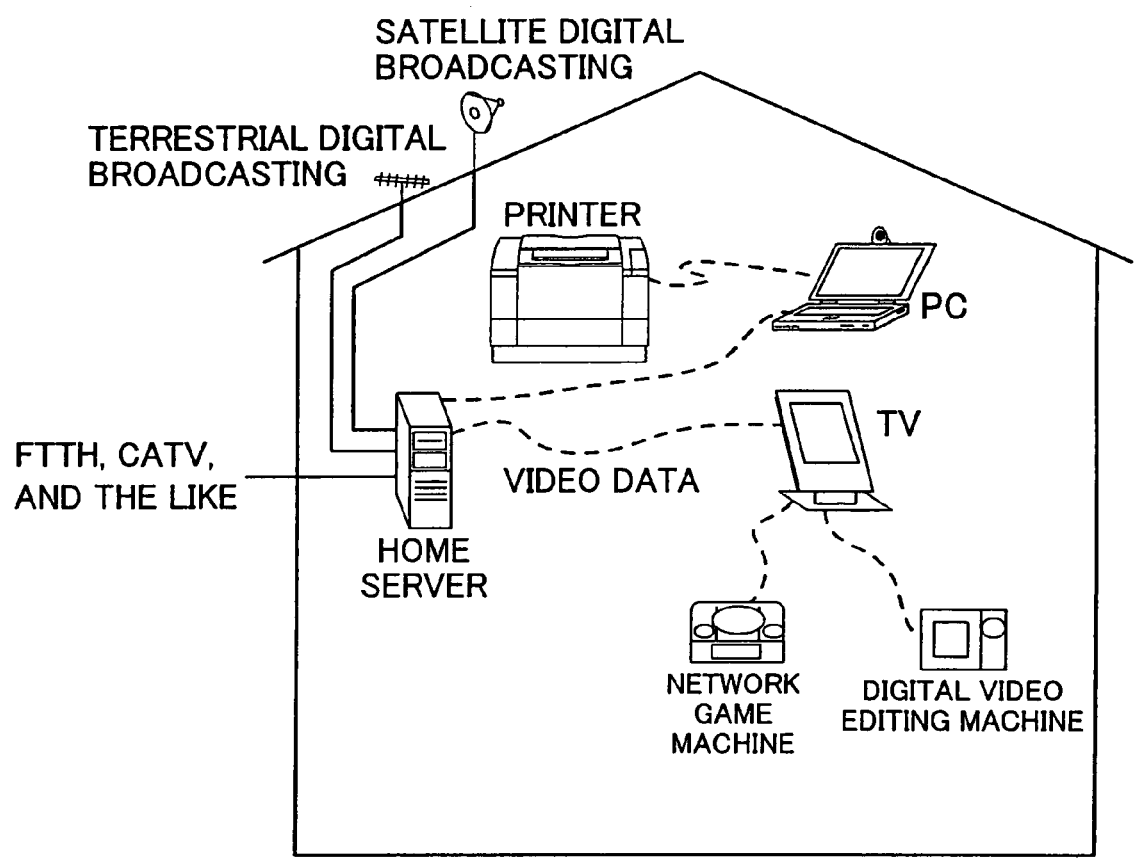
FIG. 10 is a conceptual diagram illustrating a domestic application example of the single-conductor full-duplex two-way communication.
Figure 11:
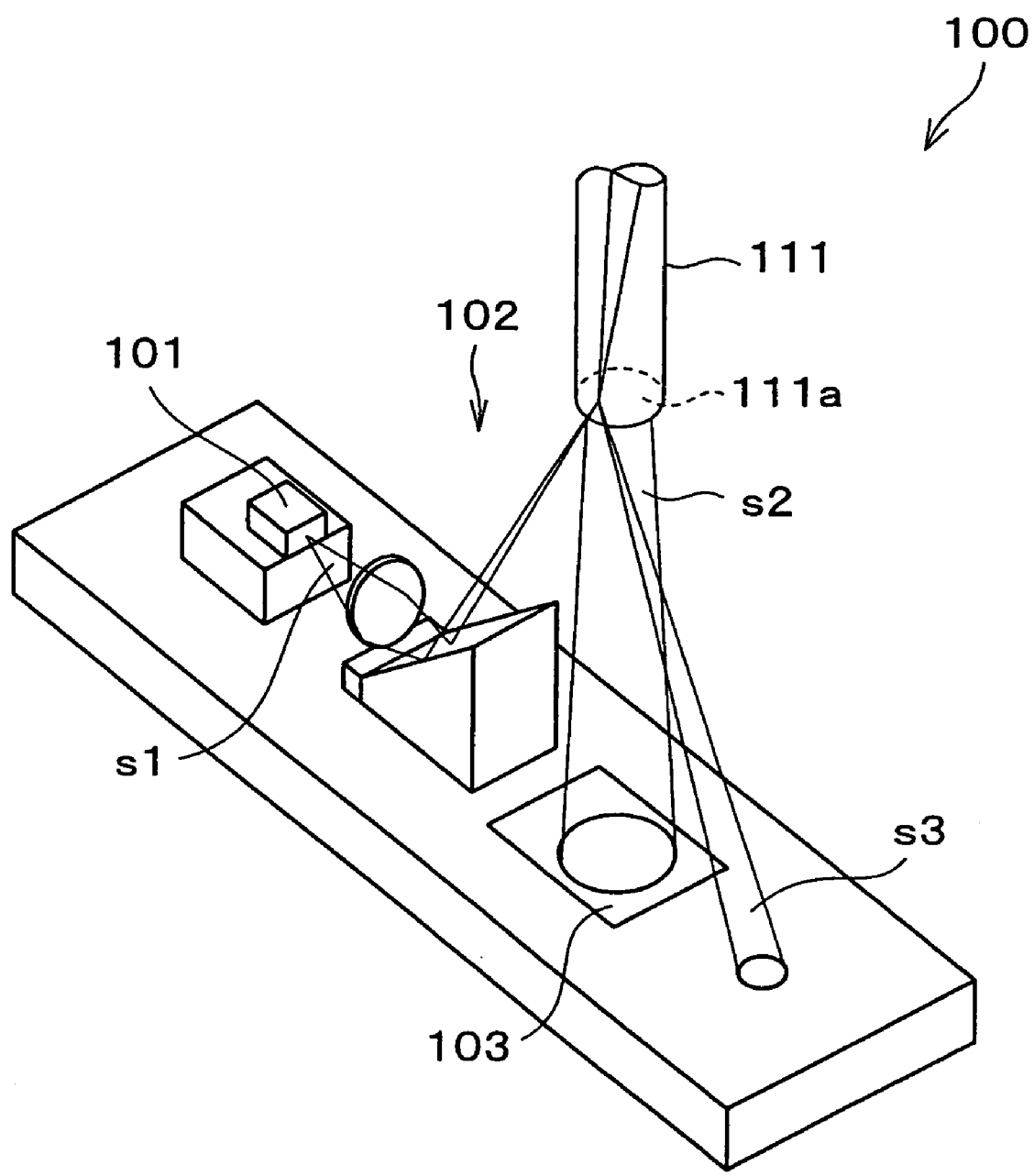
FIG. 11 is a perspective view illustrating a schematic arrangement of a conventional optical sending and receiving device.

It is confirmed that, in many kinds of optical systems, there is a trade-off between (i) a receiving efficiency at a receiver with respect to light emitted from an optical fiber and (ii) a far-end reflectivity. This is shown in FIG. 7, which illustrates an example of a relationship between the receiving efficiency and the far-end reflectivity. In FIG. 7, the relationship between the receiving efficiency and the far-end reflectivity of the receiver is ascertained under a condition that a 1 mm-diameter POF is used, and an emission NA is 0.35, the emission NA being expressed as an angle that gives a half value of a peak intensity of a light beam at the end of the optical fiber.

The reason for this trade-off is described with reference to FIGS. 8(a) and 8(b). FIGS. 8(a) and 8(b) explains with illustration that there is the trade-off between (i) the receiving efficiency at a receiver 22 with respect to the light emitted from the optical fiber 21 and (ii) the far-end reflectivity.

In order to lower the far-end reflectivity by preventing a reflected light s22 of an emitted light s21 from geometrically returning into the optical fiber 21, an effective measure is to slant a light-receiving surface 22a of the receiver 22. However, if the light-receiving surface 22a is slanted, a substantive light-receiving area of the receiver 22 for receiving the emitted light s21 is decreased. That is, a projection area of the emitted light 22a on the receiver 22 is increased. Therefore, it can be said that there is the trade-off between (i) the receiving efficiency at the receiver with respect to the light emitted from the optical fiber and (ii) the far-end reflectivity.

Discussed next is how the receiving efficiency and the far-end reflectivity influence the signal-noise ratio SN (the eye opening ratio IO). As seen from Formula 18, whereas the far-end reflectivity FR_ influences only on one term, the receiving efficiency (the minimum receiving efficiency Rmin in formula 18) influences two terms. Therefore, it is expected that the receiving efficiency will have a greater influence on the signal-noise ratio SN.

This is confirmed in FIGS. 9(a) and 9(b). FIGS. 9(a) and 9(b) are graphs showing influences of the receiving efficiency and the far-end reflectivity on the eye opening ratio IO in a test product that performs transmission at 500 Mbps. FIG. 9(a) is about a case in which the far-end reflectivity is 1.4% (a reflectivity at the receiver: 0.7%; a reflectivity on a receiver-side end surface of the optical fiber: 0.7%). FIG. 9(b) is about a case in which the far-end reflectivity is 2.1% (the reflectivity at the receiver: 1.4%; the reflectivity on the receiver-side end surface of the optical fiber: 0.7%). When FIG. 9(a) and FIG. 9(b) are compared, it is found that the far-end reflectivity in FIG. 9(b) is 1.5 times higher than the far-end reflectivity in FIG. 9(a). However, in order to attain the same eye opening 0.8 ns in FIGS. 9(a) and (b), it is sufficient to improve the receiving efficiency only by 0.2 dB (0.1%, from −5.9 dB to −5.7 dB).

Therefore, it can be said that, even if the far-end reflectivity on the receiver side is sacrificed, it is preferable to increase the receiving efficiency of the optical system in order to obtain a receiver of higher performance (better signal-noise ratio, higher eye opening IO, and lower BER).

At this stage, the single-conductor full-duplex two-way optical communication system 10 is considered. It should be noted that, whereas the signal-noise ratio SN at the second module 12b can be improved by improving the receiving efficiency at the second module 12b, whether to increase or decrease the far-end reflectivity on the side of the second module 12b (the far-end reflectivity on the side of the second module 12b seen from the first module 12a) has no influence on the signal-noise ratio SN at the second module 12b. The far-end reflectivity on the side of the second module 12b does not influence the optical signal received by the second module 12b, but influences the optical signal received by the first module 12a. That is, the signal-noise ratio SN at the second module 12b is influenced by the receiving efficiency at the second module 12b and the far-end reflectivity on the side of the first module 12a.

Under such a relationship, if the far-end reflectivity on the side of the first module 12a and the far-end reflectivity on the side of the second module 12b are adjusted to predetermined values in advance, the receiving efficiency, which significantly influences the signal-noise ratio SN, is sacrificed because the receiving efficiency is constrained by the far-end reflectivity. This can be an obstacle in improving the signal-noise ratio SN. The same is almost equally true with a relationship between the far-end reflectivity and the sent light transmittance.

In view of the circumstances, in a manufacturing method of the present invention, priority is given to the receiving efficiency at the first module 12a with respect to the light emitted from the optical fiber 11, and a position of the first module 12a with respect to the optical fiber 11 is determined in accordance with the receiving efficiency. Specifically, for example, the position of the first module 12a (especially of the receiving section 14a) with respect to the optical fiber 11 is determined so as to maximize the receiving efficiency. As a result, the position of the first module 12a is the position as shown in FIG. 8(a), for example. Then, the far-end reflectivity FR_ in the position is ascertained, and the sender-side fiber-coupled optical power S1_ or the sent light transmittance PT1_ is set in accordance with the far-end reflectivity FR_ so as to satisfy Formula 18 or Formula 19.

That is, although the far-end reflectivity on the sender side is increased if priority is given to the receiving efficiency on the sender side, a loss of quality of the signal light received on the receiver side can be compensated by (i) adjusting the sender-side fiber-coupled optical power on the sender side, or (ii) by performing an adjustment of the optical-fiber transmittance of the signal light sent from the sender side, the adjustment being performed by adjusting a property of the signal light, for example. As a result, it is possible to manufacture a single-conductor full-duplex two-way optical communication system 10 that satisfies the requirement for the signal-noise ration SN (eye opening IO and BER).

Moreover, the signal-noise ratio SN can be improved with a simple arrangement, such as the arrangement shown in FIG. 8(a), which is simpler than the arrangement shown in FIG. 8(b). Therefore, it is possible to manufacture a single-conductor full-duplex two-way optical communication system 10 that is advantageous in terms of a manufacturing cost.

Note that, although the foregoing explanation supposes that the first module 12a is the sender side and the second module 12b is the receiver side, the same setting may be adopted while supposing that the second module 12b is the sender side and the first module 12a is the receiver side. In this case also it is possible to manufacture a single-conductor full-duplex two-way optical communication system 10 that as a whole satisfies the requirement for the signal-noise ration SN.

Second Embodiment

In the first embodiment, in accordance with the far-end reflectivity FR_ on the side of the first module 12a, (i) the sender-side fiber-coupled optical power S1_, which is the power of light coupled into the optical fiber 11 from the first module 12a, is adjusted according to Formula 18, or (ii) the sender-side transmittance PT1_, which is the transmittance of the optical fiber 11 with respect to the first signal light s1 emitted from the first module 12a, is adjusted according to Formula 19.

In this case, it is necessary to ascertain the far-end reflectivity of each module, and to individually adjust the sender-side fiber-coupled optical power or the optical-fiber transmittance with respect to the signal light.

However, ranges of variation of the sender-side fiber-coupled optical power and of the optical-fiber transmittance of the signal light are determined by what kinds of optical system and of light source are used in the sending section 13a of the first module 12a (the sender side). There is no problem if the variation falls within the ranges acceptable in the single-conductor full-duplex two-way optical communication system 10, that is, if the acceptable minimum fiber-coupled optical power Smin and the acceptable minimum transmittance PTmin are satisfied.

For example, in the foregoing example, the minimum fiber transmittance of the 10 m-optical fiber is −5.1 dB if an LED is used as the light source of the sending section 13a of the first module 12a, whereas the minimum fiber transmittance is −3.1 dB if an LD is used as the light source of the sending section 13a of the first module 12a. The minimum fiber-coupled optical power is −10.9 dB if an LED is used, whereas the minimum fiber-coupled optical power is between −7 dB and −10 dB if an LD is used. As described above, the minimum fiber transmittance and the minimum fiber-coupled optical power are determined by a kind and specification of the light source, and by the optical system.

Therefore, in a method of the present invention for manufacturing the single-conductor full-duplex two-way optical communication system 10, a group of modules used as the first module 12a are determined in accordance with (i) the far-end reflectivity and (ii) the sender-side minimum fiber-coupled optical power S1min or the sent light minimum transmittance PT1min in a group of modules of the same kind.

Here, the sender-side minimum fiber-coupled optical power S1min is a minimum value among various values of the power of light coupled into the optical fiber 11 from the group of modules of the same kind. The sent light minimum transmittance PT1min is a minimum value among various values of the transmittance of the optical fiber 11 with respect to the signal light emitted from the group of modules of the same kind. The modules of the same kind are modules uniformly designed in terms of particular properties (here, (i) an optical power property relating to the power of light coupled, (ii) a wavelength relating to the transmittance, and the like).

If "Smin" in Formula 17 is considered as a variable (the sender-side minimum fiber-coupled optical power S1min_), Formula 17 can be expressed as Formula 20. If "PTmin" in Formula 17 is considered as a variable (the sent light minimum transmittance PT1min_), Formula 17 can be expressed as Formula 21.

(a) If $IO \geq 0.3$ (20)

$$\frac{(1-IO)}{0.7} > \frac{S\max * \left(\frac{NR}{R\min} + FR\_ * PT\max^2\right) + X * \frac{Namp}{R\min}}{S1\min\_ * PT\min}$$

(b) If $IO < 0.3$ $$1 > \frac{S\max * \left(\frac{NR}{R\min} + FR\_ * PT\max^2\right) + X * \frac{Namp}{R\min}}{S\min\_ * PT\min}$$

(a) If $IO \geq 0.3$ (21)

$$\frac{(1-IO)}{0.7} > \frac{S\max * \left(\frac{NR}{R\min} + FR\_ * PT\max^2\right) + X * \frac{Namp}{R\min}}{S\min * PT1\min\_}$$

(b) If $IO < 0.3$ $$1 > \frac{S\max * \left(\frac{NR}{R\min} + FR\_ * PT\max^2\right) + X * \frac{Namp}{R\min}}{S\min * PT1\min\_}$$

With respect to plural groups of modules, the modules having a possibility of being used as the first module 12a and the modules being of different kinds from group to group, the sender-side minimum fiber-coupled optical power S1min or the sent light minimum transmittance PT1min is determined in advance with respect to each group. Then, in accordance with the far-end reflectivity FR_ on the side of the first module 12a, a group in which the S1min_ satisfies formula 20 or the PT1min_ satisfies Formula 21 is selected. By using, as the first module 12a, the modules included in the selected group, it is possible to manufacture a single-conductor full-duplex two-way optical communication system 10 that satisfies the requirement for the signal-noise ratio SN.

Note that, as in the first embodiment, the position of the first module 12a is determined with priority to the receiving efficiency of the optical fiber 11 with respect to the light emitted into the first module 12a.

In Formula 20 or Formula 21, the range of the acceptable far-end reflectivity is narrower than in Formula 18 or Formula 19. However, it is possible to save time and labor to adjust the properties of the modules individually.

In the first embodiment or the second embodiment, (i) either one of the sender-side fiber-coupled optical power S1_ and the sender-side minimum fiber-coupled optical power S1min_ and (ii) either one of the sent light transmittance PT1_ and the sent light minimum transmittance PT1min_ are considered to be variables, respectively. Alternatively, however, the following may be considered to be variables, respectively: (the sender-side fiber-coupled optical power S1_)×(the sent light transmittance PT1_), (the sender-side minimum fiber-coupled optical power S1min_)×(the sent light minimum transmittance PT1min_), (the sender-side fiber-coupled optical power S1_)×(the sent light minimum transmittance PT1min_), and (the sender-side minimum fiber-coupled optical power S1min_)×(the sent light transmittance PT1_).

As described above, in a method of the present invention for manufacturing an optical communication system including (i) an optical fiber and (ii) first and second modules respectively provided at both ends of the optical fiber, the first and second modules being capable of simultaneously sending and receiving optical signals via the optical fiber, S1_ or PT1_ is set in accordance with a value of FR_ so as to satisfy Formula 18 or Formula 19.

With this method, by giving priority to determining a condition that significantly influences an improvement of the eye opening ratio, it is possible to manufacture an optical communication system at a low cost and with more freedom in manufacturing.

In a method of the present invention for manufacturing an optical communication system including (i) an optical fiber and (ii) first and second modules respectively provided at both ends of the optical fiber, the first and second modules being capable of simultaneously sending and receiving optical signals via the optical fiber, modules included in a group that satisfies Formula 20 or Formula 21 are used as the first module in accordance with a value of FR_.

With this method, it is possible to save time and labor to set the properties of the modules individually.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention can be used for manufacturing an optical communication system including (i) an optical fiber and (ii) modules respectively provided at both ends of the optical fiber, the modules being capable of simultaneously sending and receiving optical signals via the optical fiber.

The invention claimed is:

1. A method of manufacturing an optical communication system including (i) an optical fiber and (ii) first and second modules respectively provided at both ends of the optical fiber, the first and second modules simultaneously sending and receiving optical signals via the optical fiber, wherein:

a position of the first module with respect to the optical fiber is determined in accordance with a receiving efficiency at the first module with respect to light emitted from the optical fiber; and S1_ is set in accordance with a value of FR_ in the position so as to satisfy (a) If $IO \geq 0.3$ $$\frac{(1-IO)}{0.7} > \frac{S\max * \left(\frac{NR}{R\min} + FR\_ * PT\max^2\right) + X * \frac{Namp}{R\min}}{S1\_ * PT\min}$$

(b) If $IO < 0.3$ $$1 > \frac{S\max * \left(\frac{NR}{R\min} + FR\_ * PT\max^2\right) + X * \frac{Namp}{R\min}}{S1\_ * PT\min}$$

where FR_ is a far-end reflectivity, which is a reflectivity of light that is emitted from the second module and is reflected (i) by the first module and (ii) by the first-module-side end of the optical fiber; S1_ is the power of light coupled into the optical fiber from the first module; Smax is a maximum value acceptable in the optical communication system of the power of light coupled into the optical fiber; PTmin is a minimum value acceptable in the optical communication system of a transmittance of the optical fiber with respect to the optical signals; PTmax is a maximum value acceptable in the optical communication system of the transmittance of the optical fiber with respect to the optical signals; NR is a ratio, with respect to Smax, of a stray light component received by the second module, the stray light component being generated on the second-module-side end of the optical fiber and in the second module when light coupled into the optical fiber with power of Smax is emitted from the second module; Rmin is a minimum receiving efficiency at the second module with respect to light emitted from the optical fiber; Namp is a light amount corresponding to a noise in an amplifier for converting, into an electric signal, an optical signal received by the second module; IO is an eye opening ratio required for the electric signal obtained by conversion through the amplifier; and X is a ratio, with respect to Namp, of an optical signal received by the second module when a bit error rate is in an upper limit value acceptable in the optical communication system, and when there is no reflected light returning to the second module after being emitted from the second module.

2. A method of manufacturing an optical communication system including (i) an optical fiber and (ii) first and second modules respectively provided at both ends of the optical fiber, the first and second modules simultaneously sending and receiving optical signals via the optical fiber, wherein:

a position of the first module with respect to the optical fiber is determined in accordance with a receiving efficiency at the first module with respect to light emitted from the optical fiber;

the method comprising selecting, in accordance with a value of FR in said position, from plural groups of modules, the modules being different from group to group, a group in which S1mn_ satisfies, (a) If $IO \geq 0.3$ $$\frac{(1-IO)}{0.7} > \frac{S\max*\left(\frac{NR}{R\min}+FR\_*PT\max^2\right)+X*\frac{Namp}{R\min}}{S1\min\_*PT\min}$$

(b) If $IO < 0.3$ $$1 > \frac{S\max*\left(\frac{NR}{R\min}+FR\_*PT\max^2\right)+X*\frac{Namp}{R\min}}{S1\min\_*PT\min}$$

and using one of the plural modules included in the selected group as the first module, where FR_ is a far-end reflectivity, which is a reflectivity of light that is emitted from the second module and is reflected (i) by the first module and (ii) by the first-module-side end of the optical fiber; S1min_ is a minimum value of power of light coupled into the optical fiber from the selected group of modules used as the first module; Smax is a maximum value in the optical communication system of the power of light coupled into the optical fiber; PTmin is a minimum value in the optical communication system of a transmittance of the optical fiber with respect to the optical signals; PTmax is a maximum value in the optical communication system of the transmittance of the optical fiber with respect to the optical signals; NR is a ratio, with respect to Smax, of a stray light component received by the second module, the stray light component being generated on the second-module-side end of the optical fiber and in the second module when light coupled into the optical fiber with power of Smax is emitted from the second module; Rmin is a minimum receiving efficiency at the second module with respect to light emitted from the optical fiber; Namp is a light amount corresponding to a noise in an amplifier for converting, into an electric signal, an optical signal received by the second module; IO is an eye opening ratio required for the electric signal obtained by conversion through the amplifier; and X is a ratio, with respect to Namp, of an optical signal received by the second module when a bit error rate is in an upper limit value acceptable in the optical communication system, and when there is no reflected light returning to the second module after being emitted from the second module.

3. A method of manufacturing an optical communication system including (i) an optical fiber and (ii) first and second modules respectively provided at both ends of the optical fiber, the first and second modules simultaneously sending and receiving optical signals via the optical fiber, wherein:

a position of the first module with respect to the optical fiber is determined in accordance with a receiving efficiency at the first module with respect to light emitted from the optical fiber; and PT1_ is set in accordance with a value of FR_ in the position so as to satisfy (a) If $IO \geq 0.3$ $$\frac{(1-IO)}{0.7} > \frac{S\max*\left(\frac{NR}{R\min}+FR\_*PT\max^2\right)+X*\frac{Namp}{R\min}}{S\min*PT1\_}$$

(b) If $IO < 0.3$ $$1 > \frac{S\max*\left(\frac{NR}{R\min}+FR\_*PT\max^2\right)+X*\frac{Namp}{R\min}}{S\min*PT1\_}$$

where FR_ is a far-end reflectivity, which is a reflectivity of light that is emitted from the second module and is reflected (i) by the first module and (ii) by the first-module-side end of the optical fiber; PT1_ is a transmitivity of the optical fiber with respect to light emitted from the first module; Smin is a minimum value in the optical communication system of power of light coupled into the optical fiber; Smax is a maximum value in the optical communication system of the power of light coupled into the optical fiber; PTmax is a maximum value in the optical communication system of a transmittance of the optical fiber with respect to the optical signals; NR is a ratio, with respect to Smax, of a stray light component received by the second module, the stray light component being generated on the second-module-side end of the optical fiber and in the second module when light coupled into the optical fiber with power of Smax is emitted from the second module; Rmin is a minimum receiving efficiency at the second module with respect to light emitted from the optical fiber; Namp is a light amount corresponding to a noise in an amplifier for converting, into an electric signal, an optical signal received by the second module; IO is an eye opening ratio required for the electric signal obtained by conversion through the amplifier; and X is a ratio, with respect to Namp, of an optical signal received by the second module when a bit error rate is in an upper limit value acceptable in the optical communication system, and when there is no reflected light returning to the second module after being emitted from the second module.

4. A method of manufacturing an optical communication system including (i) an optical fiber and (ii) first and second modules respectively provided at both ends of the optical fiber, the first and second modules simultaneously sending and receiving optical signals via the optical fiber, wherein:

a position of the first module with respect to the optical fiber is determined in accordance with a receiving efficiency at the first module with respect to light emitted from the optical fiber;

the method comprising selecting, in accordance with a value of FR_ in said position, from plural groups of modules, the modules being different from group to group, a group in which PT1min_ satisfies, (a) If $IO \geq 0.3$ $$\frac{(1-IO)}{0.7} > \frac{S\max*\left(\frac{NR}{R\min}+FR\_*PT\max^2\right)+X*\frac{Namp}{R\min}}{S\min*PT1\min\_}$$

(b) If $IO < 0.3$ $$1 > \frac{S\max*\left(\frac{NR}{R\min}+FR\_*PT\max^2\right)+X*\frac{Namp}{R\min}}{S\min*PT1\min\_}$$

and using one of the plural modules included in the selected group as the first module, where FR_ is a far-end reflectivity, which is a reflectivity of light that is emitted from the second module and is reflected (i) by the first module and (ii) by the first-module-side end of the optical fiber; $PT1min\_$ is a minimum value of a transmittance of the optical fiber with respect to light emitted from the selected group of modules used as the first module; Smin is a minimum value in the optical communication system of power of light coupled into the optical fiber; Smax is a maximum value in the optical communication system of the power of light coupled into the optical fiber; PTmax is a maximum value in the optical communication system of a transmittance of the optical fiber with respect to the optical signals; NR is a ratio, with respect to Smax, of a stray light component received by the second module, the stray light component being generated on the second-module-side end of the optical fiber and in the second module when light coupled into the optical fiber with power of Smax is emitted from the second module; Rmin is a minimum receiving efficiency at the second module with respect to light emitted from the optical fiber; Namp is a light amount corresponding to a noise in an amplifier for converting, into an electric signal, an optical signal received by the second module; IO is an eye opening ratio required for the electric signal obtained by conversion through the amplifier; and X is a ratio, with respect to Namp, of an optical signal received by the second module when a bit error rate is in an upper limit value acceptable in the optical communication system, and when there is no reflected light returning to the second module after being emitted from the second module.

5. The method of manufacturing an optical communication system as set forth in any one of claims 1 to 4, wherein:
the optical fiber is a plastic optical fiber.

* * * * *